United States Patent
Pande et al.

(10) Patent No.: US 12,505,240 B2
(45) Date of Patent: Dec. 23, 2025

(54) APPLICATION-AWARE DCF DATA AUTHENTICATION

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/189,675

(22) Filed: Mar. 24, 2023

(65) Prior Publication Data
US 2024/0320355 A1    Sep. 26, 2024

(51) Int. Cl.
*G06F 21/62* (2013.01)
*G06F 21/57* (2013.01)
*H04L 9/40* (2022.01)

(52) U.S. Cl.
CPC .......... *G06F 21/6218* (2013.01); *G06F 21/57* (2013.01); *H04L 63/126* (2013.01)

(58) Field of Classification Search
CPC ..... G06F 21/6218; G06F 21/57; H04L 63/126
See application file for complete search history.

(56) References Cited

U.S. PATENT DOCUMENTS

| | | | | |
|---|---|---|---|---|
| 9,449,074 B1 * | 9/2016 | Fisher | ...................... | G06F 7/24 |
| 10,789,264 B2 * | 9/2020 | Crabtree | ............... | G06F 16/254 |
| 10,915,545 B2 * | 2/2021 | Vankamamidi | ......... | G06Q 40/00 |
| 2008/0046758 A1 * | 2/2008 | Cha | .......................... | G06F 21/10 |
| | | | | 713/189 |
| 2013/0133070 A1 * | 5/2013 | Mahaffey | .............. | G06F 21/577 |
| | | | | 726/23 |
| 2015/0106929 A1 * | 4/2015 | Mahaffey | .............. | G06F 21/562 |
| | | | | 726/23 |
| 2020/0125704 A1 * | 4/2020 | Chavez | .................. | G06F 21/32 |
| 2022/0058385 A1 * | 2/2022 | Hui | ......................... | G06F 16/35 |
| 2023/0004888 A1 * | 1/2023 | Li | ............................ | G06F 16/93 |
| 2023/0267113 A1 * | 8/2023 | Reineke | ................ | G06F 16/215 |
| | | | | 707/690 |
| 2023/0267194 A1 * | 8/2023 | Reineke | .................. | G06F 21/64 |
| | | | | 726/22 |
| 2024/0289474 A1 * | 8/2024 | Avni | ....................... | G06F 21/53 |

FOREIGN PATENT DOCUMENTS

| | | | | | |
|---|---|---|---|---|---|
| WO | WO-03005236 A2 * | 1/2003 | | ............ | G06F 19/28 |
| WO | WO-2020075485 A1 * | 4/2020 | | | |

* cited by examiner

*Primary Examiner* — Joseph P Hirl
*Assistant Examiner* — Aayush Aryal
(74) *Attorney, Agent, or Firm* — Workman Nydegger (57) ABSTRACT

One example method includes receiving, at a node of a data confidence fabric, data from a data source, determining, by the node, whether the data source is listed in a portfolio of data sources, when the data source is listed in the portfolio, processing, by the node, the data, when the data source is not listed in the portfolio, performing, by the node, an analysis of the data, when the analysis reveals that the data is recognized by the node, processing, by the node, the data, and when the analysis reveals that the data is not recognized by the node, performing an action.

20 Claims, 4 Drawing Sheets

APPLICATION-AWARE DCF DATA AUTHENTICATION

FIELD OF THE INVENTION

Embodiments of the present invention generally relate to data confidence fabrics (DCF). More particularly, at least some embodiments of the invention relate to systems, hardware, software, computer-readable media, and methods, for authentication of data in a DCF.

BACKGROUND

A data confidence fabric may be used to annotate data, and devices that handle the data. In this way, a consumer of the data, such as an application, may be able to access confidence information about the data, and then make a decision as to whether or not the data will be consumed. However, a node of a DCF presently has no way to determine if data received by the node, such as from a DCF device, is unexpected, or to determine if the data is received from an unexpected source. That is, there is no known mechanism that enables control plane applications operating at DCF nodes to understand the type of traffic they are seeing, and to filter out the non-required traffic.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics (DCF). More particularly, at least some embodiments of the invention relate to systems, hardware, software, computer-readable media, and methods, for authentication of data in a DCF.

In an embodiment, a device may be securely onboarded to a DCF and subjected to an application discovery process. The device, which may operate as a node of the DCF, may receive a DCF plug-in for each of its whitelisted applications. The DCF plugin may enable an application on that DCF node to enable the device to interact with trusted data received by the device. As part of the plugin process, the DCF node may receive an application device portfolio, for example, that includes information about devices that the DCF node will interact with, and the data that may be expected to be received from those edge devices. When the DCF node receives data/metadata from a device not included in the device portfolio, the DCF node can treat that data/metadata as untrusted. At this point, various actions may be taken by the DCF node, such as rejecting the data from the unknown device, processing the data but without applying any indication of confidence to the data, or registering the data with an annotation that indicates the data is foreign and then resume processing the data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a DCF node may be able to identify data/metadata that is coming from a device and/or application unknown to the DCF node. As another example, a DCF node may be able to determine that data/metadata coming from a device and/or application is native to an application running on the DCF node and, if so, may process the data/metadata with confidence. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview of an Example Embodiment

An embodiment of the invention may operate to leverage application-aware features of a DCF, and may use a data inspection process, performed at one or more nodes of the DCF, to verify that expected data is flowing through the DCF, by way of those nodes, and may take corresponding action when a data packet is out-of-spec, that is, when data/metadata is received from an application not known to the node(s). Thus configured, according to an embodiment of the invention, a DCF may be aware, by way of its node(s), of the type of applications that are overlayed on top of it, that is, the applications running on nodes of the DCF environment.

In an embodiment, the DCF may expect data only from a specific sensor portfolio within that environment. Thus, any new device and/or data/metadata which does not meet the specifications and requirements of that environment may be treated as foreign or unrecognized. When such device and/or data/metadata has been identified as foreign, the DCF can take corresponding action(s). Such action(s) might include, but are not limited to, (a) not allowing the data to be communicated through the DCF, or utilize the DCF in any way, or (b) not assigning a confidence score to the data, or (c) penalizing the data by assigning a negative confidence score to the data. An understanding of the specifications and requirements of the DCF environment may be imparted to DCF nodes manually or using an automated process. However, a manual process would likely be impractical for all but the smallest DCF environments. On the other hand, an automated process, such as may be implemented by an embodiment of the invention, may comprise the use of a process that enables the DCF to understand the data moving in the DCF by intercepting data packets, at a DCF node for example, and then evaluating the data. In an embodiment, the evaluation of data by a node of the DCF may be performed as part of a machine learning (ML) and/or artificial intelligence (AI) process. With this overview in mind, the following discussion addresses various other aspects that may be implemented in an example embodiment of the invention.

B. Aspects of Example Operating Environments

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

Figure 1A:
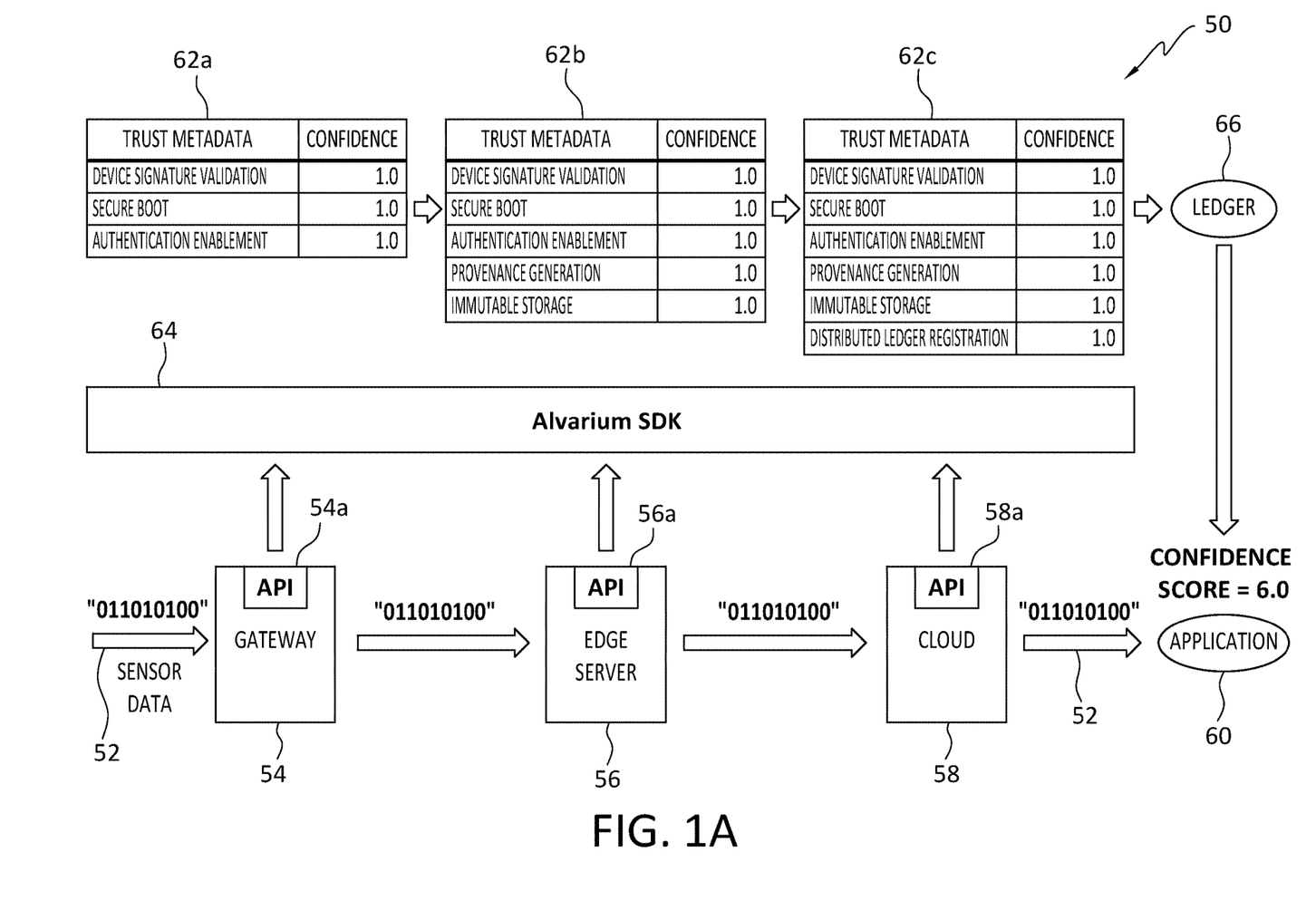
FIGS. 1A and 1B disclose aspects of an architecture according to one example embodiment.

With reference now to FIG. 1a, embodiments of the invention may be implemented in a variety of operating environments, one example of which is a DCF denoted at 50 in FIG. 1a. In general, the DCF 50 may annotate and score any data that flows within it, providing increased confidence to the applications that use that data, such as for analytical purposes for example.

As shown in FIG. 1a, the example DCF 50 concerns the context of edge-based use cases, but the scope of the invention is not limited to such cases or contexts. As shown in FIG. 1a, data such as sensor data 52 generated by a sensor flows through one or more tiers, or layers, of the DCF. In the illustrated example, the data 52 may flow through nodes such as a gateway 54, edge server 56, and cloud ecosystem 58, and may ultimately be consumed by one or more applications 60. As trusted handling of the data 52, at the nodes of the various layers, occurs during data 52 delivery, respective trust metadata 62a, 62b, and 62c may be associated with the data 52 by those nodes, that is, by the gateway 54, edge server 56, and/or, cloud ecosystem 58. Thus, trust metadata may continue to accumulate as the data 52 passes through the various nodes in its path.

The trust metadata 62a, 62b, and 62c, may comprise, for example, respective confidence scores associated with trust insertion processes performed by the nodes with respect to the data 52. The trust metadata 62a, 62b, and 62c may be associated with the data 52 by respective node APIs (Application Program Interfaces) 54a, 56a, and 58a that communicate with an interface 64 such as an Alvarium SDK (Software Development Kit). After the data 52 has transited the various nodes, the final, comprehensive trust metadata 62c may be entered into a ledger 66 which may make the trust metadata 62c available for use by the applications 60. Note that, in this example, the trust metadata 62c is an accumulation of all the trust metadata respectively added by the gateway 54, edge server 56, and cloud ecosystem 58.

To illustrate with reference to the specific example of FIG. 1a, the gateway 54 may annotate, to the data 52, respective trust metadata 62a for each of three different operations. Particularly, the gateway 54 may annotate trust metadata 62a that indicates, among other things: the gateway 54 has successfully validated the signature coming from the device that generated the data 52; the gateway 54 has used a TPM chip to confirm that the BIOS, firmware, or O/S on the gateway 54 was tampered with during boot; and, the gateway 54 is currently running authentication/authorization software to protect the data 52 stream from unwanted inspection or access. With continued reference to the trust metadata, including the trust metadata 62a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 62a, ultimately arrives at the ledger 66, where a ledger entry may be created that permanently records the contents of the trust metadata 62a table as well as an overall Confidence Score, which is 6.0 in this illustrative example. Note that the equation used to calculate the Confidence Score in the example of FIG. 1a is simply a summation of confidence scores, but other approaches to calculating an overall Confidence Score may alternatively be employed.

A useful aspect of the example DCF 50 is that, as a result of the annotation of trust metadata 62a, 62b, and 62c, the application 60 may have access to additional context about the trustworthiness of the data 52, addressing the problem of potentially untrustworthy or malicious data sources. The problems presented by such data sources is increasingly faced by enterprise customers as they move their business logic closer to non-enterprise, and potentially untrustworthy, data sources at the edge and/or elsewhere. In the example DCF 50, the path of the data 52 may be largely software-dependent, in the sense that data path handling software, which may comprise a respective instance at each of the gateway 54, edge server 56, and cloud ecosystem 58, may call an annotation/scoring API 54a, 56a, and 58a, respectively, and routing software may be provided at these nodes that forwards the annotations along the data path. However, such software dependencies in a DCF, such as the DCF 50 for example, may lead to vulnerabilities in the trustworthiness of the actual DCF metadata, that is, the trust metadata 62a, 62b, and/or 62c, for example. Examples of such potential vulnerabilities are described below.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

C. Aspects of an Example Embodiment

Figure 1B:
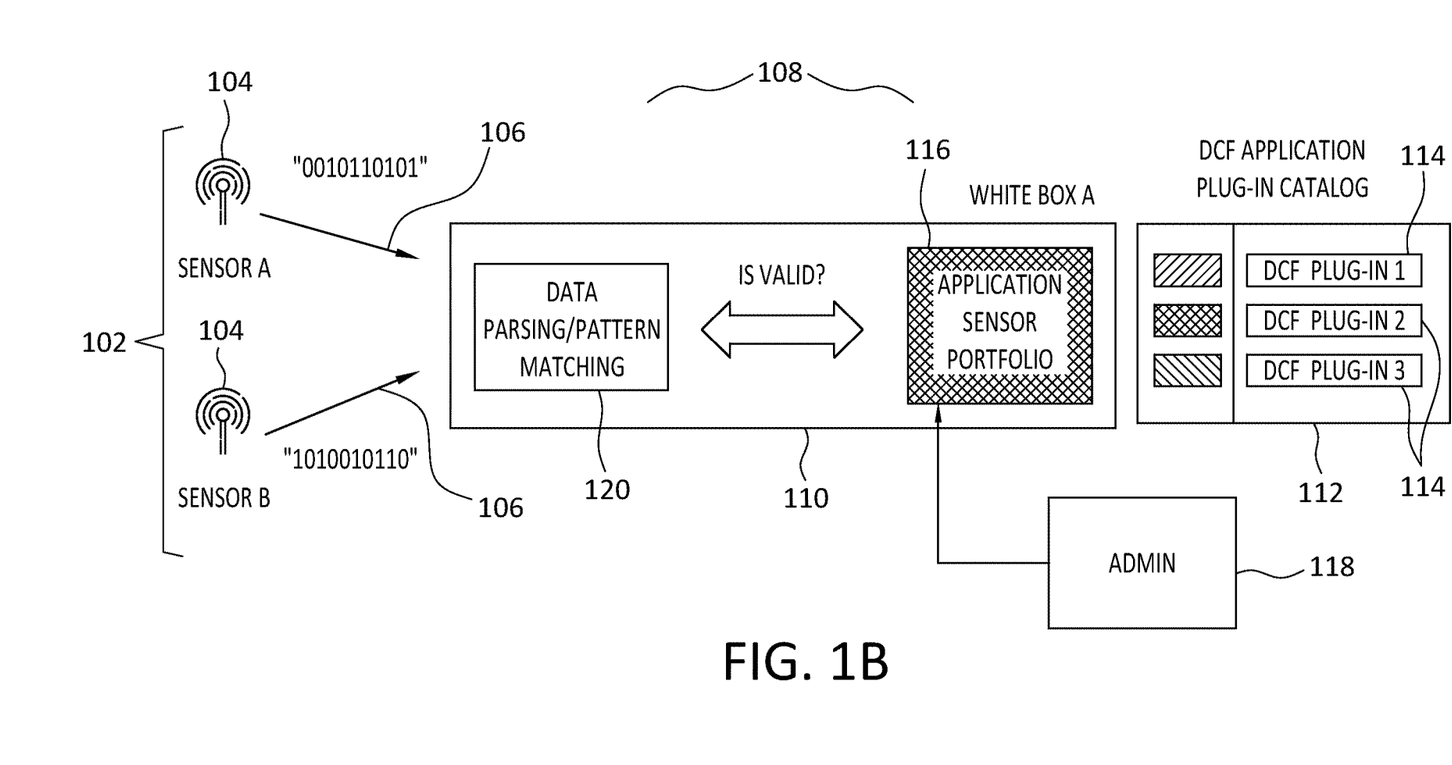

With particular attention now to FIG. 1b, a first tier 102 of a DCF 100 may comprise one or more devices 104 comprising hardware and/or software operable to generate new/modified data, and each of which may constitute a respective node of the DCF 100. In an embodiment, one of the devices 104 may comprise a sensor of some type, but that is not required. One or more of the devices 104 may be an edge, or near-edge, device. As shown, the devices 104 may transmit respective new/modified data/metadata 106. In an embodiment, the data/metadata 106 may be transmitted to another tier 108 of the DCF 100.

The tier 108 may comprise one or more devices 110 which comprise additional respective nodes of the DCF 100. In the example of FIG. 1b, the device 110 is denoted as a 'White Box' because it has been successfully onboarded using a secure device onboarding and application discovery process. In connection with that process, a DCF application plug-in catalog 112 may provide a respective DCF plug-in 114 for each of the applications running on the device 110. Among other things, the DCF plug-in 114 may enable the device 110 to perform data handling and DCF annotation, that is, annotation of confidence metadata, with respect to data that is native to the application to which the DCF plug-in 114 corresponds.

During the plug-in 114 installation process, and as part of a secure device onboarding process, application device portfolio information 116 may be sent, by a source 118 of the DCF such as an administrative node or another source, to the DCF node, that is, to the device 110. In general, the application device portfolio information 116 may comprise information such as, but not limited to, information about the devices from which the device 110 can expect to receive data/metadata, and/or may comprise information about the data itself such as data type, data standard, and data format. In an embodiment, a device identified in the application device portfolio information 116 may comprise information about a sensor, or other edge device or system, but no particular device or system is implied or required in any embodiment. In general, one example of such a device may be referred to herein as a 'data source,' inasmuch as that device passes a stream of data to another node of the DCF 100, such as to the device 110 for example. In one particular example, the application device portfolio information 116 may contain a number of different records, each including information about a respective device, such as a hardware sensor for example, that will interoperate with the application running on the device 110 and for which a DCF plug-in 114 has been installed. A record may additionally, or alternatively, include information about the expected format(s) of data to be transmitted by those hardware sensors, or other devices.

In operation, the device 110 may receive data from a data source, such as a sensor B 104 for example. If the device 110 determines, such as by examination of the application device portfolio 116, that the data source does not belong to the sensor portfolio, the data received by the device 110 from that data source may then be analyzed as part of a data parsing and/or pattern matching process 120. This analysis may comprise scanning, by the device 110, the data/metadata coming from Sensor B, and determining, based on the scan, that the data is not recognized as coming from a device known to the device 110.

When this determination has been made, the device 110 may take various actions. Such actions may be automatically selected, or may be specified by an admin. For example, the device 110 may reject the data from the unknown sensor types/device from which the data was received. As another example, the device 110 may process the data without applying a confidence score to the data. The device 110 may apply a negative confidence score to the analyzed data. As a final example, the device 110 may register or report the data, annotate the data as foreign, and then resume processing of the data. In an embodiment, the annotation applied to the data may include metadata about the unrecognized device, such as the identity of the unrecognized device.

As will be apparent from the present disclosure then, and according to one example embodiment, a device may inspect received packet content and then consult DCF metadata, such as in the form of an application device portfolio, to determine whether or not the data is native to the application running on the receiving device, and can therefore be processed with confidence by the receiving device. In this way, an embodiment may implement data classification in a way that integrates with DCF structures and operations.

D. Example Methods

Figure 2:
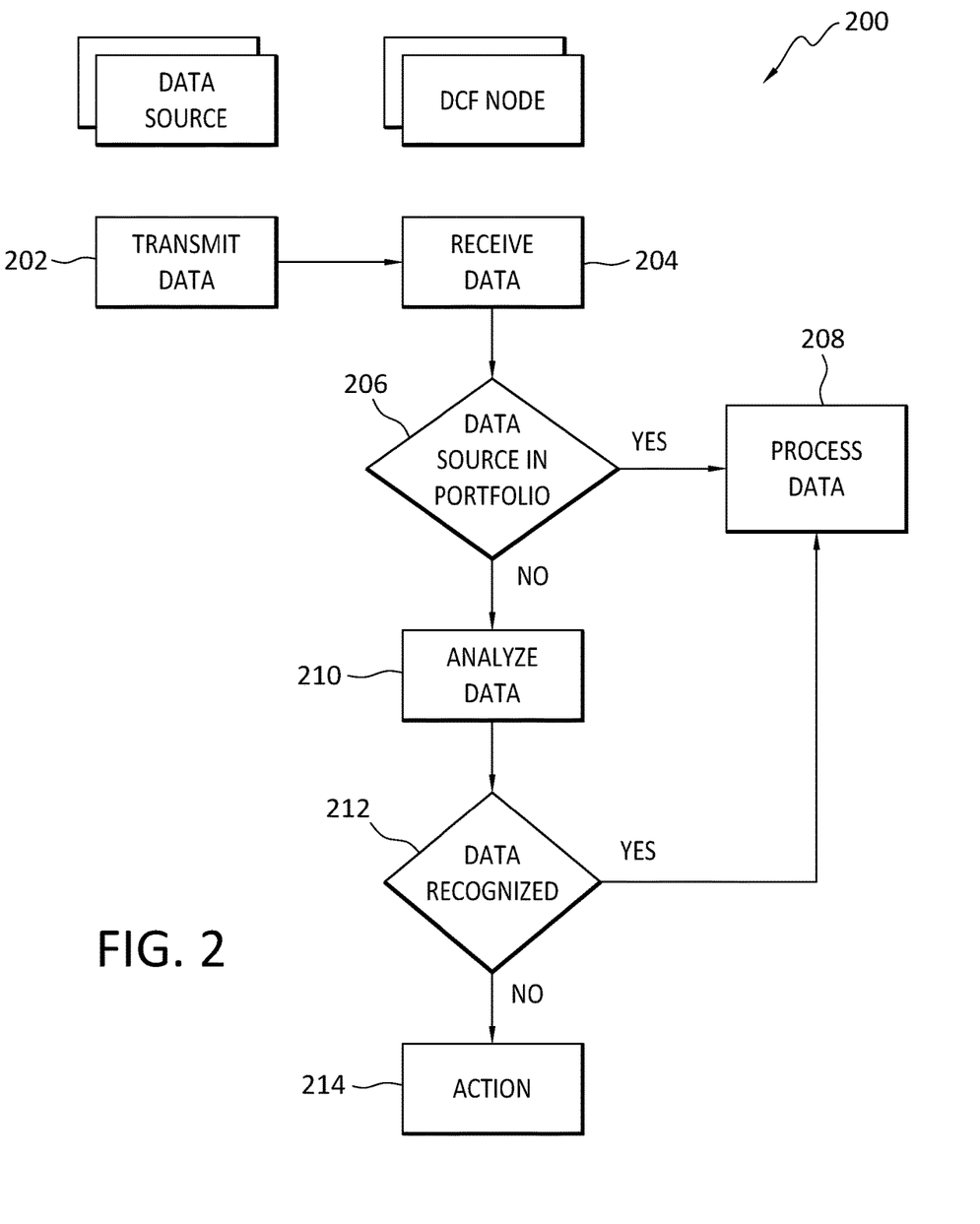
FIG. 2 discloses aspects of a method according to one example embodiment.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, a method according to one example embodiment is denoted at 200. The method 200 may begin when a data source, such as a sensor for example, transmits 202 data to a DCF node which then receives 204 the transmitted data. Because the data may include metadata identifying the data source, the DCF node may then perform a check 206 to determine if the data source is listed in an application device portfolio at the DCF node. If the data source is recognized by the DCF node, that is, the data source is listed in the application device portfolio, then the data that was received 204 may be processed 208 by the application at the DCF node.

If it is determined 206 that the data source is not in the application device portfolio, the data received 204 from the data source may be analyzed 210. In an embodiment, the analysis 210 may comprise performing a scan of the data that comprises a data parsing process and/or a data pattern matching process to determine if the data/patterns match known data/patterns. If a match is found, indicating that the data/patterns are recognized 212, the method 200 may return to 208. If the data is not recognized 212, one or more actions may be taken 214, examples of which are disclosed elsewhere herein.

E. Further Example Embodiments

Following are some further example embodiments of the invention. These are presented only by way of example and are not intended to limit the scope of the invention in any way.

Embodiment 1. A method, comprising: receiving, at a node of a data confidence fabric, data from a data source; determining, by the node, whether the data source is listed in a portfolio of data sources; when the data source is listed in the portfolio, processing, by the node, the data; when the data source is not listed in the portfolio, performing, by the node, an analysis of the data; when the analysis reveals that the data is recognized by the node, processing, by the node, the data; and when the analysis reveals that the data is not recognized by the node, performing an action.

Embodiment 2. The method as recited in any preceding embodiment, wherein the data source comprises a sensor.

Embodiment 3. The method as recited in any preceding embodiment, wherein devices listed in the portfolio comprise respective data sources that are permitted to interact with an application running on the node.

Embodiment 4. The method as recited in any preceding embodiment, wherein the node includes a data confidence fabric plug-in that enables an application running on the node to handle, and annotate, data received by the node from a recognized data source.

Embodiment 5. The method as recited in any preceding embodiment, wherein the portfolio includes information about data sources, and data, that can interoperate with an application running on the node.

Embodiment 6. The method as recited in any preceding embodiment, wherein a confidence score of the data is adjusted based on an outcome of the analysis.

Embodiment 7. The method as recited in any preceding embodiment, wherein the action comprises rejecting the data.

Embodiment 8. The method as recited in any preceding embodiment, wherein the action comprises processing the data without applying a confidence score to the data.

Embodiment 9. The method as recited in any preceding embodiment, wherein performing the analysis comprises performing a data parsing process to determine if a type or format of the data matches a known type or format of data.

Embodiment 10. The method as recited in any preceding embodiment, wherein performing the analysis comprises performing a pattern matching process to determine if a pattern in the data matches a known data pattern.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
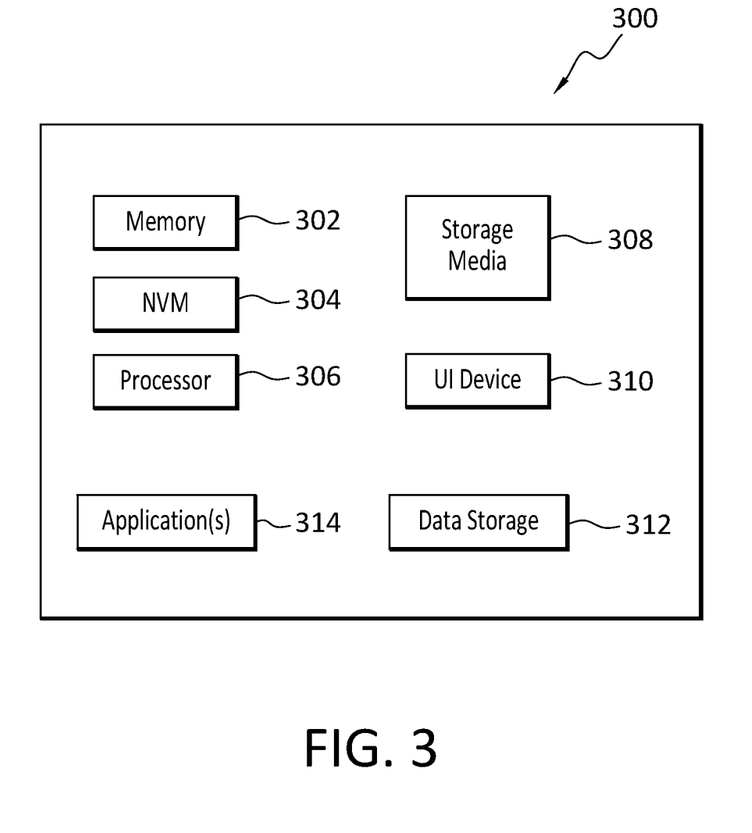
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, at a node of a data confidence fabric, data from a data source;
   determining, by the node, whether the data source is listed in a portfolio of data sources, wherein the portfolio of data sources comprises information about applications, which run on the node and correspond to the data sources;
   when the data source is listed in the portfolio, processing, by a first one of the applications corresponding to the data source, the data;
   when the data source is not listed in the portfolio, performing, by the node, an analysis of the data;
   when the analysis reveals that a pattern of the data is recognized by the node, processing, by a second one of the applications corresponding to the pattern of the data, the data; and
   when the analysis reveals that the data is not recognized by the node, penalizing the data by assigning a negative confidence score to the data.

2. The method as recited in claim 1, wherein the data source comprises a sensor.

3. The method as recited in claim 1, wherein devices listed in the portfolio comprise respective data sources that are permitted to interact with an application running on the node.

4. The method as recited in claim 1, wherein the node includes a data confidence fabric plug-in that enables an application running on the node to handle, and annotate, data received by the node from a recognized data source.

5. The method as recited in claim 1, wherein the portfolio includes information about data sources, and data, that can interoperate with an application running on the node.

6. The method as recited in claim 1, wherein a confidence score of the data is adjusted based on an outcome of the analysis.

7. The method as recited in claim 1, wherein penalizing the data comprises rejecting the data.

8. The method as recited in claim 1, wherein penalizing the data comprises processing the data without applying a confidence score to the data.

9. The method as recited in claim 1, wherein performing the analysis comprises performing a data parsing process to determine if a type or format of the data matches a known type or format of data.

10. The method as recited in claim 1, wherein performing the analysis comprises performing a pattern matching process to determine if a pattern in the data matches a known data pattern.

11. A non-transitory storage medium having stored therein instructions that are executable by one or more hardware processors to perform operations comprising:
    receiving, at a node of a data confidence fabric, data from a data source;
    determining, by the node, whether the data source is listed in a portfolio of data sources, wherein the portfolio of data sources comprises information about applications, which run on the node and correspond to the data sources;
    when the data source is listed in the portfolio, processing, by a first one of the applications corresponding to the data source, the data;
    when the data source is not listed in the portfolio, performing, by the node, an analysis of the data;
    when the analysis reveals that a pattern of the data is recognized by the node, processing, by a second one of the applications corresponding to the pattern of the data, the data; and
    when the analysis reveals that the data is not recognized by the node, penalizing the data by assigning a negative confidence score to the data.

12. The non-transitory storage medium as recited in claim 11, wherein the data source comprises a sensor.

13. The non-transitory storage medium as recited in claim 11, wherein devices listed in the portfolio comprise respective data sources that are permitted to interact with an application running on the node.

14. The non-transitory storage medium as recited in claim 11, wherein the node includes a data confidence fabric plug-in that enables an application running on the node to handle, and annotate, data received by the node from a recognized data source.

15. The non-transitory storage medium as recited in claim 11, wherein the portfolio includes information about data sources, and data, that can interoperate with an application running on the node.

16. The non-transitory storage medium as recited in claim 11, wherein a confidence score of the data is adjusted based on an outcome of the analysis.

17. The non-transitory storage medium as recited in claim 11, wherein penalizing the data comprises rejecting the data.

18. The non-transitory storage medium as recited in claim 11, wherein penalizing the data comprises processing the data without applying a confidence score to the data.

19. The non-transitory storage medium as recited in claim 11, wherein performing the analysis comprises performing a data parsing process to determine if a type or format of the data matches a known type or format of data.

20. The non-transitory storage medium as recited in claim 11, wherein performing the analysis comprises performing a pattern matching process to determine if a pattern in the data matches a known data pattern.

* * * * *